Sept. 18, 1934.   R. R. JONES   1,974,280
FLOOR COVERING
Filed June 13, 1932
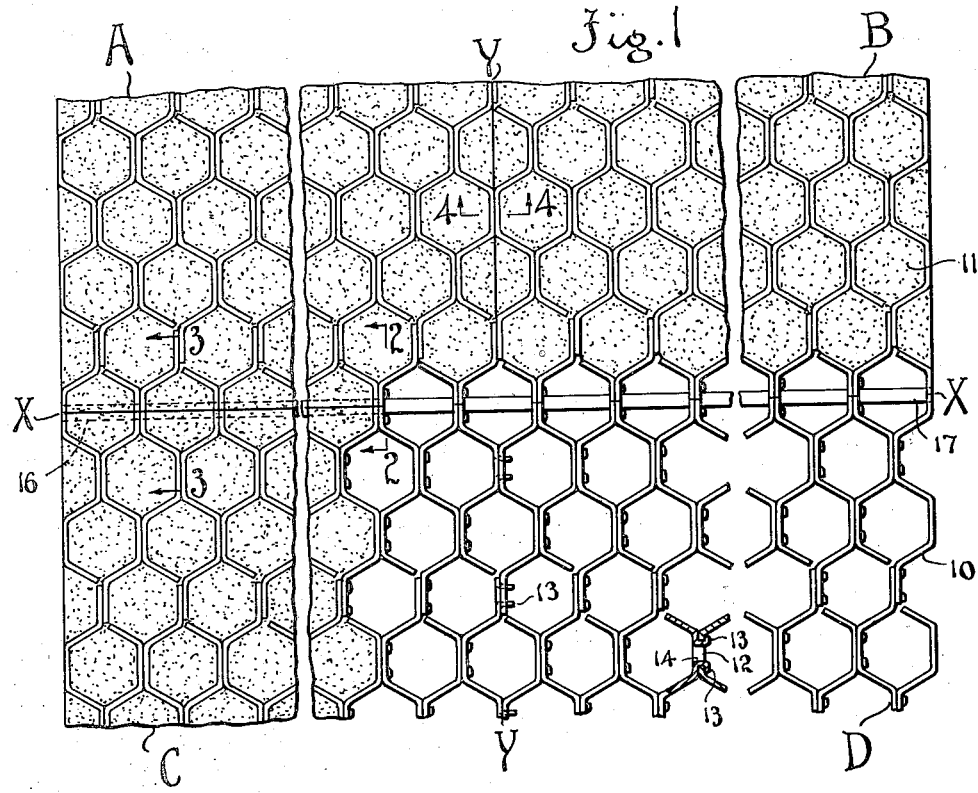
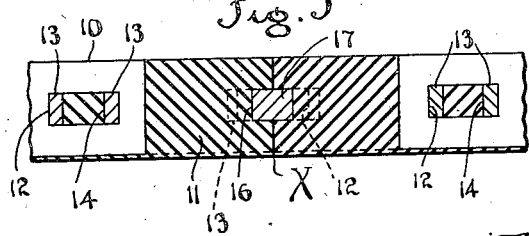
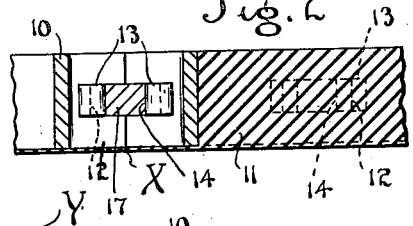
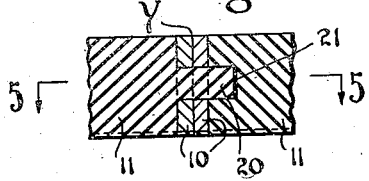
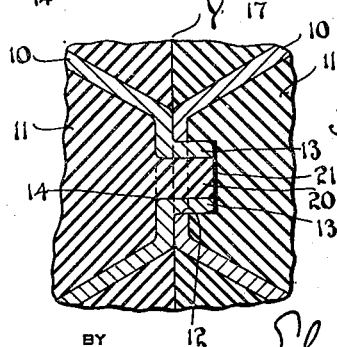
INVENTOR
Robert R. Jones
BY
ATTORNEYS Patented Sept. 18, 1934

1,974,280

UNITED STATES PATENT OFFICE

1,974,280
FLOOR COVERING

Robert R. Jones, Akron, Ohio, assignor to The Firestone Tire & Rubber Company, Akron, Ohio, a corporation of Ohio Application June 13, 1932, Serial No. 616,863

3 Claims. (Cl. 154—49)

This invention relates to floor coverings, and more especially it relates to floor coverings consisting of two or more pieces, sheets or strips of floor covering material including improved mechanical means for connecting the abutting margins of said pieces or strips.

The invention is of primary utility in forming a smooth flush surface on floor coverings made up of a plurality of pieces, sheets or strips of metal-reinforced rubber floor covering material, and it provides an interlock of the metal reinforcing portions of the respective pieces or strips which readily may be connected or disconnected.

The chief objects of the invention are to maintain the floor covering in smooth condition; to prevent curling or loosening of the abutting marginal portions of the pieces or strips constituting a floor covering; and to assure accurate registry of design at the juncture of two pieces of floor covering.

Of the accompanying drawing:

Figure 1 is a plan view of a floor covering embodying the invention in its preferred form, parts being broken away for clearness of illustrating;

Figure 2 is a section on the line 2—2 of Figure 1;

Figure 3 is a section on the line 3—3 of Figure 1;

Figure 4 is a section on the line 4—4 of Figure 1; and

Figure 5 is a section on the line 5—5 of Figure 4.

Referring to the drawing, the floor covering comprises a reticulate metal reinforcement 10, and a rubber filler 11 that completely fills the interstices or openings in the reticulate structure. The reinforcement 10 is made up of strips of metal that are disposed upon edge, and are so formed that when a plurality of them are properly assembled they define an orderly arrangement of geometric figures, herein shown as hexagons. The rubber filler 11 is flush with the top of the reinforcing structure 10, and preferably is vulcanized to the metal, the latter being copper-plated to improve the adhesion of the rubber. The rubber filler may overflow the bottom edges of the reinforcing structure as shown, but this is not detrimental. The respective bent metal strips that make up the reinforcing structure 10 are formed in alternation throughout their length with apertures 12, and with pairs of projecting lugs 13, 13 that are struck out from the metal, there being an aperture 14 formed in the place previously occupied by said lugs. The lugs 13 of one metal strip extend through the apertures 12 of the adjacent strip and are bent or upset to lock the strips together. The rubber filler 11 extends through the apertures 12, 14 and thus constitutes a unitary structure.

The floor covering shown in Figure 1 is made up of four separate pieces or strips, A, B, C and D, the juncture of the strips being along the lines X—X and Y—Y. It will be seen that the line Y—Y is parallel to the reinforcing strips and that line X—X is transverse thereto. The line X—X extends centrally through the marginal blocks of the rubber filler 11, and transects the metal reinforcing strips centrally of the respective apertures 12, 14, between the lugs 13, as is most clearly shown in Figure 2. A groove or slot 16 is molded in the rubber structure 11 of the strips A, B, C and D along the margins defined by line X—X, said groove being coincident with the slots 14. During the installation of the floor covering a metal bar or strip 17 of rectangular section is mounted in the grooves 16 of abutting floor covering strips, with the result that relative movement of the marginal portions of the abutting strips is prevented by the interlock of the strips with the bar.

On those sides of the strips A, B, C and D that meet along the line Y—Y, the rubber filler blocks are centrally divided, but the metal reinforcing strips are nowhere severed. Instead, the marginal reinforcing strip on sheets A and C has its lugs 13 left in outwardly projecting position, and the rubber filler of the enclosed filler blocks extends through the apertures 14 and completely fills the space between said lugs as is shown at 20, Figures 4 and 5.

Along those margins of the strips B and D that abut the strips A and C are formed recesses 21 that extend into the rubber filler 11 behind each aperture 12 of the marginal metal reinforcing strip, said recesses being of such width and depth as readily to receive the lugs 13 and intervening filler rubber 20 of the strips A and C.

The interlocking of the strips A and C with strips B and D through the medium of the lugs 13 and recesses 21, and the interlocking of strips A and B with strips C and D through the medium of the grooves 16 and locking bar 17 imparts added rigidity to the marginal portions of the respective floor covering strips for the reason that the strips mutually reinforce each other and relative movement of their abutting marginal portions in the plane of the abutting surfaces is prevented.

Since both interlocking means lie wholly within the marginal area of the respective floor covering strips, they are invisible after the floor covering is in completed condition, and do not produce any bulge or otherwise prevent the strips from meeting in a close, flush joint or seam. Since the interlock is not a permanent connection, no obstacle is presented to the subsequent removal of the floor covering from the floor.

Modification may be resorted to without departing from the spirit of the invention or the scope of the appended claims.

What is claimed is:

1. A floor covering comprising two or more pieces of metal-reinforced rubber floor covering material, and a metal projection on one of said pieces that interlocks with the metal and rubber of the other piece.

2. A floor covering comprising at least two pieces of molded floor covering material, each of said pieces having metal reinforcing that is exposed at intervals along the abutting margins of the pieces, and lugs including the exposed metal reinforcing and molded material of one piece adapted to interfit with apertures extending through the exposed reinforcing and molded material of the other piece.

3. A floor covering comprising at least two pieces of molded floor covering material, each of said pieces having metal reinforcing that is exposed at intervals along the abutting margins of the pieces, and lugs formed on the exposed metal reinforcing of one piece adapted to interfit with apertures extending through the exposed reinforcing of the other piece, said lugs being arranged in pairs with the molded material between them, and the molded material being recessed behind each lug-receiving aperture.

ROBERT R. JONES.